UNITED STATES PATENT OFFICE.

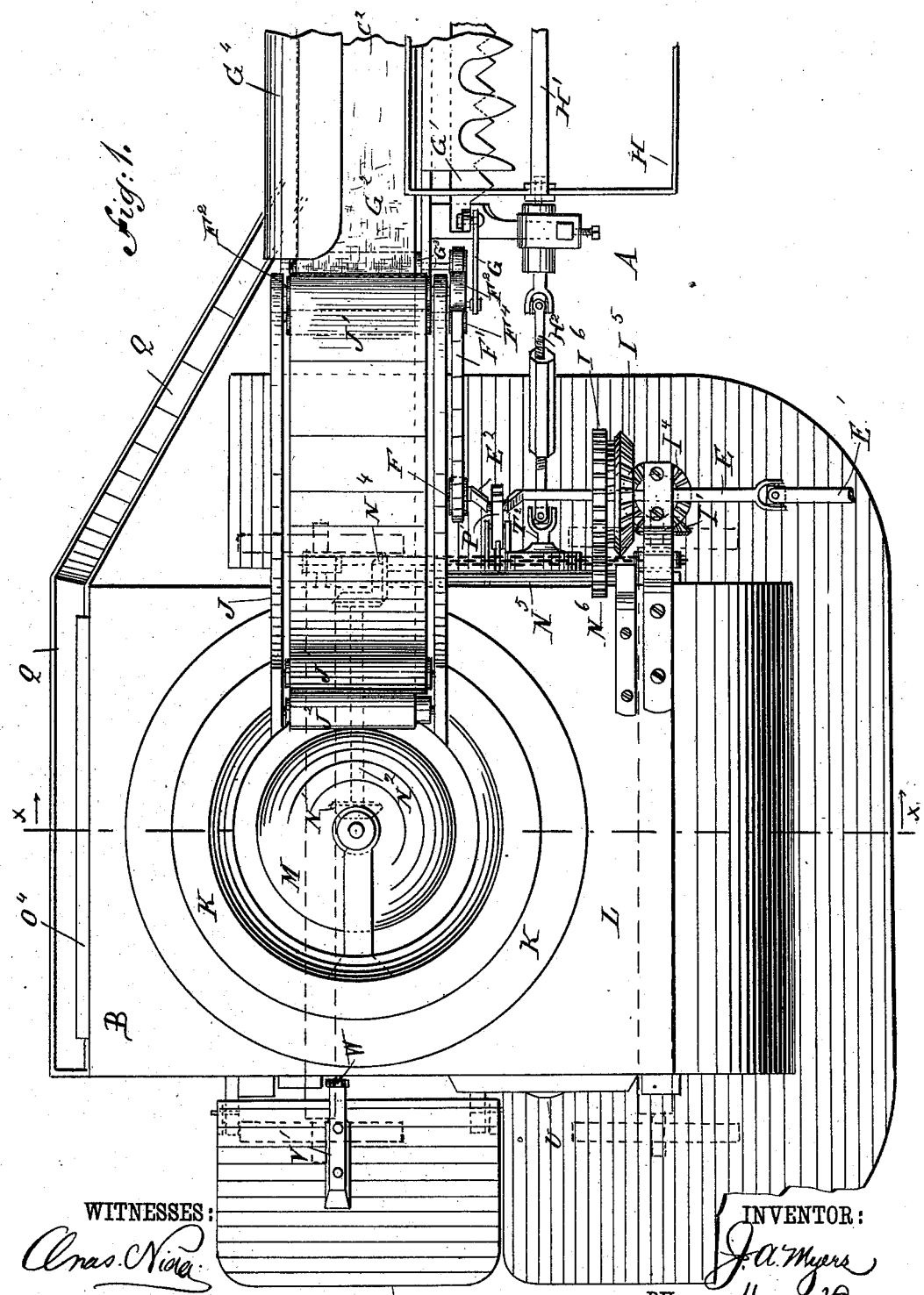

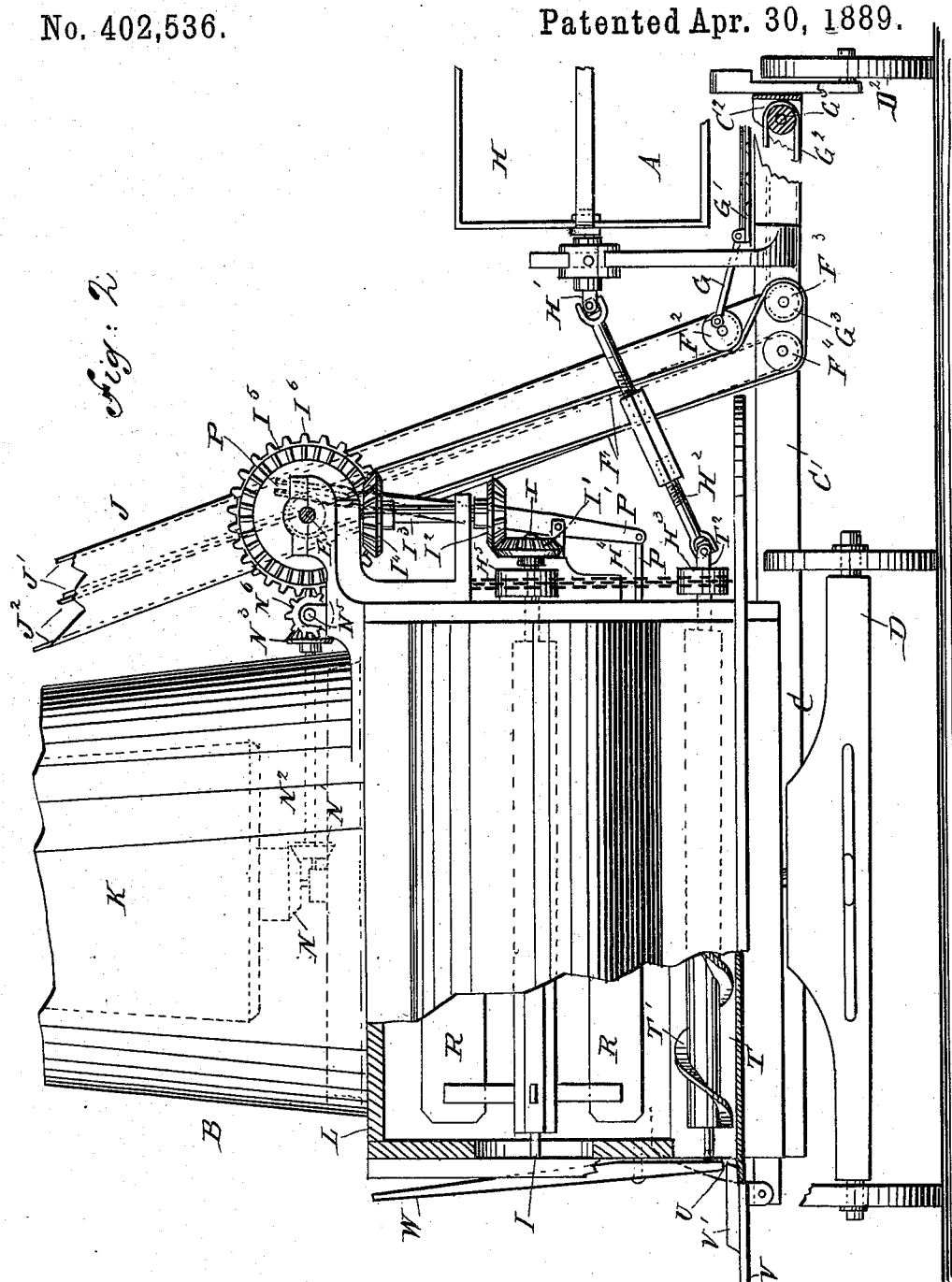

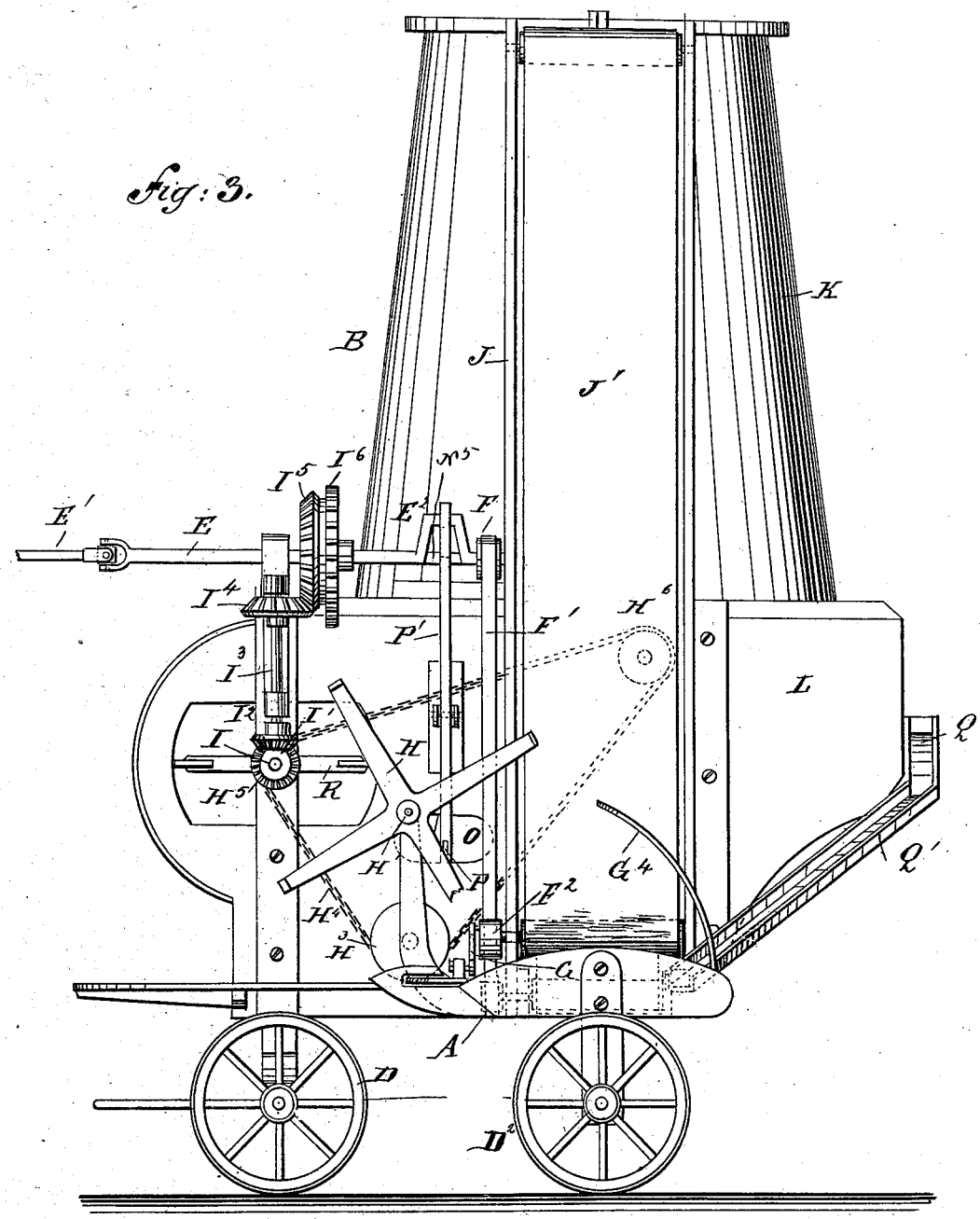

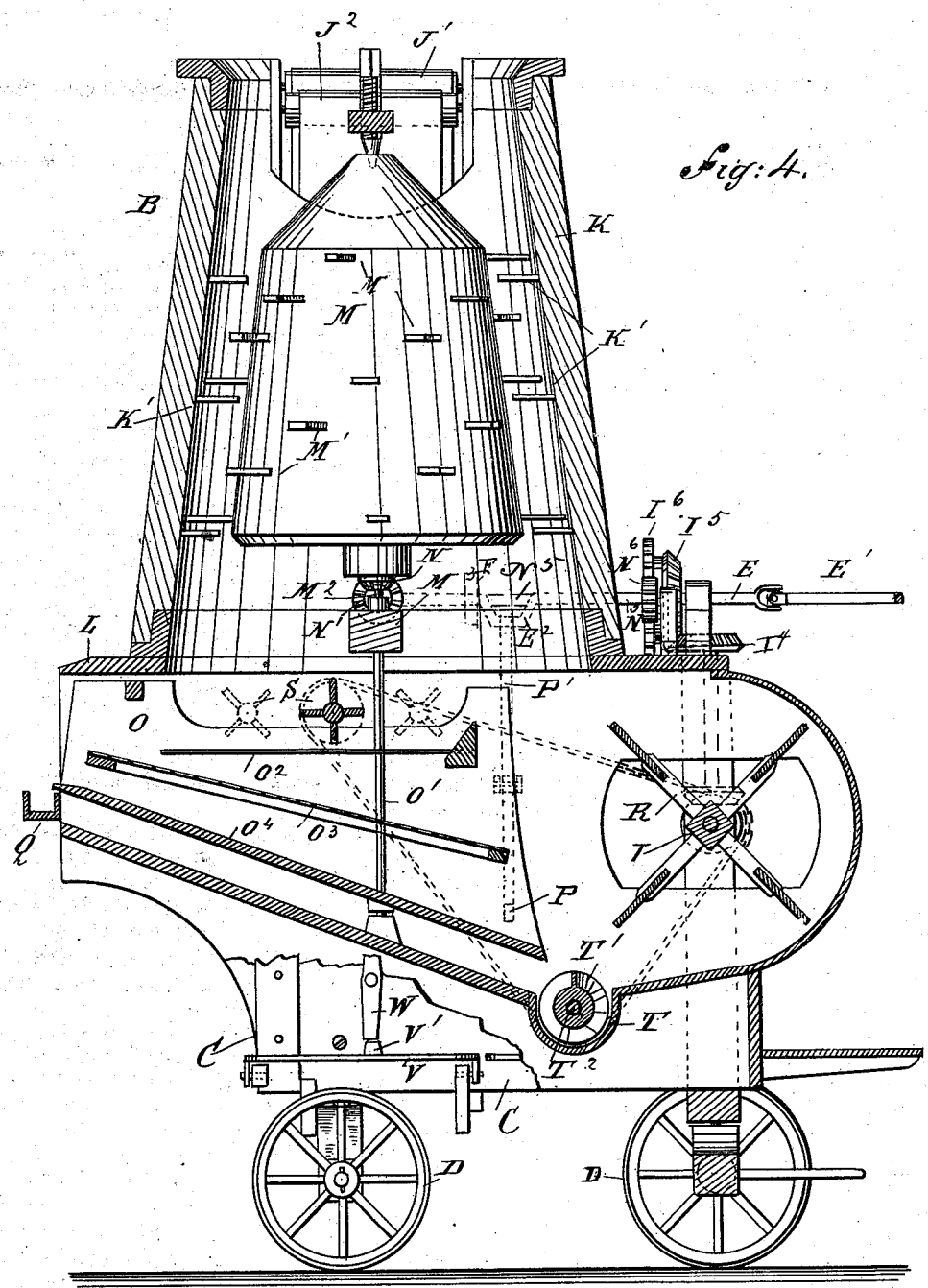

JOHN ALVIN MYERS, OF MONROE CITY, INDIANA.

COMBINED HARVESTER AND THRASHING-MACHINE.

SPECIFICATION forming part of Letters Patent No. 402,536, dated April 30, 1889.

Application filed October 26, 1887. Serial No. 253,441. (No model.)

*To all whom it may concern:*

Be it known that I, JOHN ALVIN MYERS, of Monroe City, in the county of Knox and State of Indiana, have invented a new and Improved Combined Harvester and Thrashing-Machine, of which the following is a full, clear, and exact description.

The object of my invention is to provide a new and improved thrashing-machine combined with a harvester.

The invention consists of various parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a plan view of my improvement, parts being broken away. Fig. 2 is a front elevation of the same, parts being shown in section. Fig. 3 is a side view of the same, and Fig. 4 is a vertical cross-section of the same on the line $x\ x$ of Fig. 1.

The harvester A and the thrashing-machine B are both attached to a suitable frame, C, mounted on the truck D. The main shaft E, which imparts motion to the harvester and to the thrashing-machine, is coupled to the driving-shaft E' of the engine of a portable boiler or a traction-engine. On the shaft E is secured a pulley, F, over which passes an endless belt, rope, or band, F', which also passes over the pulleys $F^2$, $F^3$, and $F^4$, of which the pulley $F^2$ serves as a crank-disk, and is connected by the pitman G with the knife-bar G' of the cutting mechanism of the harvester.

The cutting mechanism, which may be of any approved construction, is attached to the outer end, C', of the frame C. The end C' carries at its outer end the grain-wheel $D^2$, and is provided with a pocket, $C^2$, in which operates the endless apron or belt $G^2$, passing over the rollers $G^3$ and $G^5$, of which the roller $G^3$ is secured to the shaft carrying the pulley $F^3$, and is set in motion by the latter. A shield, $G^4$, extends from the rear of the end C' of the frame C, over the said pocket $C^2$, and over the endless apron $G^2$. The reel H, in front of the cutting mechanism, is of the usual construction, and its shaft H' is connected by a shaft, $H^2$, with the shaft $T^2$, provided with the pulley $H^3$, which is operated by an endless belt, $H^4$, passing also over the pulleys $H^5$ and $H^6$, of which the pulley $H^5$ is attached to the fan-wheel shaft I, provided with the bevel gear-wheel I', which meshes into the bevel gear-wheel $I^2$, secured to the upright shaft $I^3$, carrying the bevel gear-wheel $I^4$, which meshes into the bevel gear-wheel $I^5$, secured to the main shaft E.

From the end C' of the frame C extends upward a slightly-inclined elevator, J, provided with two endless belts, J' and $J^2$, which are driven, respectively, by the pulleys $F^2$ and $F^4$, the said belts being placed in such a position that their inner sides are in close contact with each other and carry between their inner sides the grain to be elevated. The upper end of the elevator J is attached to and opens into the upper end of the vertical conical shell or casing K of the thrashing-machine B, which shell rests with its base on the frame-work of the separator L, supported on the frame C.

In the shell K rotates the conical beating-drum M, provided with radial pins or teeth M', which operate in conjunction with the radial pins or teeth K' on the interior of the shell K. The beating-drum M is supported on the top by a suitable bearing attached to the shell or casing K, and its lower end is provided with a shaft, $M^2$, which has its bearing on the cross-beam $M^3$. A bevel gear-wheel, N, is secured to the said shaft $M^2$ and meshes into the bevel gear-wheel N', secured to the shaft $N^2$, which extends to the outside of the shell K and carries on its outer end a bevel gear-wheel, $N^3$, which meshes into the bevel gear-wheel $N^4$, secured to the shaft $N^5$, running parallel with the main shaft E and provided with the gear-wheel $N^6$, which meshes into the gear-wheel $I^6$, integral with the bevel gear-wheel $I^5$, and secured with the latter to the main shaft E.

The shell K opens upon the separator L, which is provided with the riddler O, vibrating on the stationary spindle O', and having one of its sides connected by the link P with the lever P', pivoted to the outside of the separator and engaging by its upper slotted end with the crank-arm $E^2$ of the main shaft E. The riddler O is provided with the straw-separating bars $O^2$ and the sieve $O^3$, below which is placed an inclined bottom, $O^4$, which discharges at its upper end into a channel or trough, Q, connected with the stationary trough Q', which leads to the pocket $C^2$ of the harvester A and discharges upon the apron $G^2$. In front of the riddler O is placed the fan or wind-wheel R, of the usual construction, and secured to the shaft I, operated from the main shaft E, as before described.

One or more beaters or distributing-wheels, S, are located across the separator, above the longitudinal bars $O^2$ of the riddler, and are operated by the pulley $H^6$ and the belt, chain, or rope $H^4$, as before described, or by other suitable means. In the bottom of the separator is a recess, T, in which is arranged a screw, T', mounted on a shaft, $T^2$, which carries the pulley $H^3$ on one end. The opposite end opens upon a lip, U, which discharges the grain to the outside of the machine and into a bag placed on the platform V, hinged to the side of the frame C, and provided with a catch, V', which can be locked in position by a lever, W, pivoted to the side of the separator and engaging the catch V' with its lower end.

The operation is as follows: The different parts of the harvester and the thrashing-machine are actuated by the rotation of the main shaft E. The reel H feeds the grain to the cutting mechanism, and the knife-bar G' cuts the upper part of the grain, which falls upon the endless apron $G^2$, which delivers it to the belts J' and $J^2$, between the inner sides of which it is carried upward and discharged upon the beating-drum M, which separates the grain from the straw. The thrashed material then falls upon the beaters S and upon the longitudinal bars $O^2$, which separate the straw from the grain, and the latter falls upon the sieve $O^3$ and through the same upon the inclined bottom or floor $O^4$, which delivers it to the screw T', which forces the grain to the outside and into a bag held upon the lip U. The straw on the longitudinal bars $O^2$ works itself toward the rear of the machine, and is discharged through the rear opening to the outside. The chaff and other impurities on the sieve $O^3$ and on the inclined bottom $O^4$ are forced to the rear by the action of the fan-wheel R and the partly-thrashed heads are discharged into the channel Q, which delivers them to the trough Q', discharging upon the apron $G^2$, which again returns them by means of the elevator J to the drum M. The riddler O is set in motion by the lever P', actuated from the crank-arm $E^2$ of the main shaft, and connected by the link P with the riddler. By disengaging the pitman G from the pulley $F^2$ and by throwing off the belt F' I am enabled to use the thrashing-machine separately without the harvester and elevator by simply turning the main shaft E by hand or by steam-power.

Having thus described my invention, what I claim as new, and desire to secure by Letters Patent, is—

1. In a combined harvester and thrashing-machine, the combination of the main driving-shaft E, provided with the pulley F, the pulleys $F^2 F^3$, the belt F', actuating the pulleys $F^2$ and $F^3$, the knife-bar G', the pitman G, connecting the knife-bar to a pin on the pulley $F^2$, the rollers $G^3$ and $G^5$, the roller $G^3$ being on the shaft of the pulley $F^3$, and the apron $G^2$, passing over said rollers, substantially as herein shown and described.

2. In a combined harvester and thrashing-machine, the combination of the main driving-shaft E, provided with the pulley F, the pulleys $F^2 F^4$, the belt F', actuating the pulleys $F^2$ and $F^4$, the knife-bar G', the pitman G, connecting the knife-bar with a pin on the pulley $F^2$, and the elevator-belts J' $J^2$, driven from the pulleys $F^2$ and $F^4$, substantially as herein shown and described.

3. The main shaft E, the pulley F, mounted on the said shaft, the endless belt or chain F', and the pulleys $F^2$, $F^3$, and $F^4$, actuated by the said belt or chain F', in combination with the pitman G, connecting the knife-bar G' with the pulley $F^2$, the endless apron or belt $G^2$, operated by the pulley $F^3$, and the endless belts J' and $J^2$, operated from the pulleys $F^2$ and $F^4$, substantially as shown and described.

JOHN ALVIN MYERS.

Witnesses:
ALBERT C. FALLS,
A. BALDWIN.